United States Patent
Yang

(10) Patent No.: US 7,478,715 B2
(45) Date of Patent: Jan. 20, 2009

(54) FLEXIBLE AND RIGID BI-STATUS COUPLER AND APPLICATION DEVICE

(76) Inventor: Tai-Her Yang, 6F-5, No. 250, Sec. 4, Chung Hsiao E. Rd, Taipei (TW)

( * ) Notice: Subject to any disclaimer, the term of this patent is extended or adjusted under 35 U.S.C. 154(b) by 0 days.

(21) Appl. No.: 11/524,324

(22) Filed: Sep. 21, 2006

(65) Prior Publication Data

US 2007/0012539 A1   Jan. 18, 2007

Related U.S. Application Data

(62) Division of application No. 10/412,588, filed on Apr. 14, 2003, now abandoned.

(51) Int. Cl.
 *F16D 47/04* (2006.01)
(52) U.S. Cl. ..................... 192/48.92; 310/100
(58) Field of Classification Search .................. 310/100
See application file for complete search history.

(56) References Cited

U.S. PATENT DOCUMENTS

| | | | | |
|---|---|---|---|---|
| 1,900,787 A | * | 3/1933 | Baugnee | 192/48.2 |
| 5,708,314 A | * | 1/1998 | Law | 310/114 |
| 5,828,136 A | * | 10/1998 | Yang | 290/4 A |
| 6,244,395 B1 | * | 6/2001 | Schlagenhaft | 188/161 |
| 6,297,575 B1 | * | 10/2001 | Yang | 310/266 |
| 2006/0032322 A1 | * | 2/2006 | Yang | 74/393 |

* cited by examiner

*Primary Examiner*—Rodney H Bonck
(74) *Attorney, Agent, or Firm*—Rabin & Berdo, P.C.

(57) ABSTRACT

A flexible and rigid bi-status coupler and its application device related to a mechanical kinetic energy coupler provided with an input side and an output side, wherein, the kinetic transmission feature is related to a flexible acceleration with revolution difference when the rotary kinetic energy is transmitted from the input side to the output side, and the kinetic transmission feature is related to a rigid transmission without revolution difference when the rotary kinetic energy is transmitted back from the output side to the input side.

1 Claim, 2 Drawing Sheets

US 7,478,715 B2

FLEXIBLE AND RIGID BI-STATUS COUPLER AND APPLICATION DEVICE

CROSS-REFERENCE TO RELATED APPLICATION

This application is a divisional of copending application Ser. No. 10/412,588, which was filed on Apr. 14, 2003.

BACKGROUND OF THE INVENTION (a) Field of the Invention

The present invention is related to a flexible and rigid bi-status coupler and its application device, and more particularly to one of rotary kinetic energy with special function that transmit the rotary kinetic energy with flexible acceleration with revolution difference from an input side to an output side for the output side to execute non-rigid transmission with revolution difference that varies with the load; on the contrary, rigid transmission without revolution difference of rotary kinetic energy is transmitted back from the output side to the input side.

The flexible and rigid bi-status coupler is applied in an energy storage impact type of load, such as a punch, a press lathe or a device driven by instable fluid force, such as a fluid force actuated extractor hood, or a fly wheel energy storage device or other loads.

(b) Description of the Prior Art

There are two types of conventional coupler, one is related to a flexible coupler, such as an electric vortex coupler, fluid coupler, or generation effect coupler, to provide non-rigid transmission varies depending on the load upon executing a rotary kinetic energy transmission between the input side and the output side; another type of coupler relates to a rigid coupler, that is a friction type of clutch driven by electromagnetic, fluid, mechanical or eccentric force with a limited range of application since both of the input side and the output side indicate synchronous coupling without revolution difference upon executing normal transmission of rotary kinetic energy between the input and the output sides.

SUMMARY OF THE INVENTION

The primary purpose of the present invention is to provide a mechanical kinetic energy coupler provided with an input side and an output side, wherein, the kinetic transmission feature is related to a flexible acceleration with revolution difference when the rotary kinetic energy is transmitted from the input side to the output side, and the kinetic transmission feature is related to a rigid transmission without revolution difference when the rotary kinetic energy is transmitted back from the output side to the input side.

DETAILED DESCRIPTION OF THE PREFERRED EMBODIMENTS

The present invention is related to a mechanical kinetic energy coupler provided with an input side and an output side, wherein, it is provided with a special function that converts the rotary kinetic energy from the input side into and flexible acceleration with revolution difference and transmit the acceleration to the output side so to execute the non rigid transmission with revolution difference that varies with the load; on the contrary, rigid transmission without revolution difference of rotary kinetic energy is transmitted back from the output side to the input side.

Figure 1:
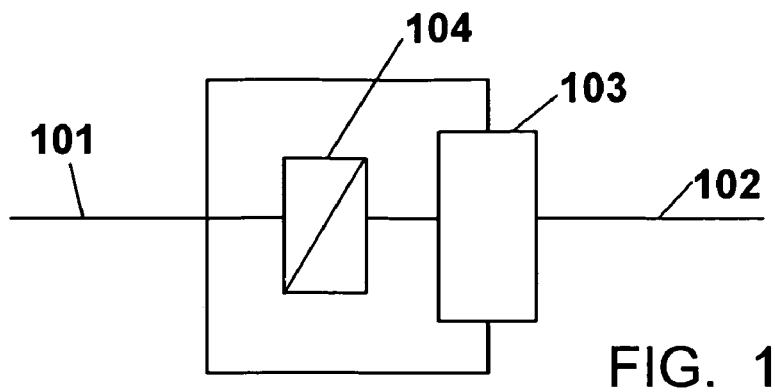
FIG. 1 is a schematic view of the structural principle of a preferred embodiment of the present invention.

Referring to FIG. 1 for a schematic view showing that a structural principle of a preferred embodiment of a flexible and rigid bi-status coupler and its application device is essentially comprised of:

an input side 101: containing an axial, wheel, disk, or any other rotary kinetic energy transmission structure to be coupled to one side of a one-way transmission 104 and also coupled to the active rotary part of a flexible transmission 103;

an output side 102: containing an axial, wheel, disk, or any other rotary kinetic energy transmission structure to be coupled to the passive rotary part of a flexible transmission 103, and then couple to the other side of the one-way transmission 104;

the flexible transmission 103: comprised of an electric vortex coupler, a fluid coupler, or a generation effect coupler, provided with a active rotary part and a passive rotary part to engage in non-rigid rotation kinetic transmission with revolution difference and the transmission varies depending on a load; or any other coupler providing the similar function, having its active rotary part coupled to the input side 101, and its passive rotary part coupled to the output side 102 and to one end of the one-way transmission 104; and the one-way transmission 104: comprised of a conventional one-way clutch, or a transmission that engages in one-way rotary transmission and idling in the other way, having its one end coupled to the input side 101 and the other end coupled to the passive rotary part of the flexible transmission 103;

By means of the structure as described above, the rotary kinetic energy is transmitted from the input side 101 to the output side 102 through flexible transmission of non-rigid transmission; on the contrary, the rotary kinetic energy transmitted back from the output side 102 through the one-way transmission 104 to the input side 101 relates to a rigid transmission without revolution difference.

Figure 2:
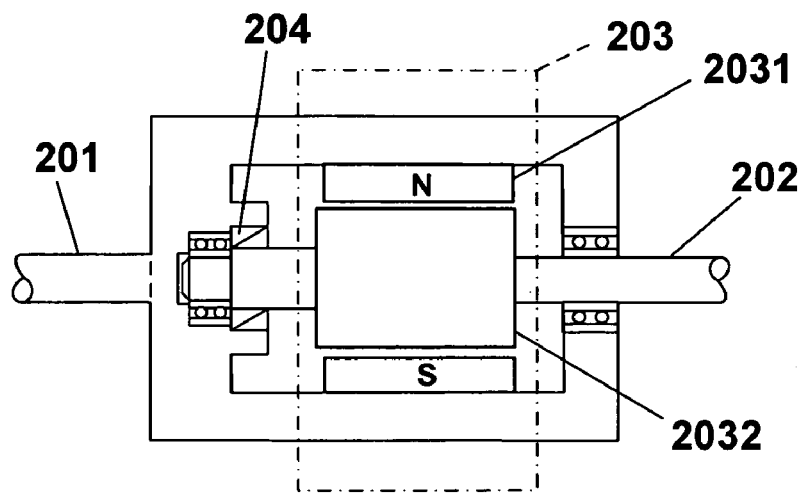
FIG. 2 is another preferred embodiment of a bi-status coupler taken from FIG. 1 that is comprised of an electric vortex coupler incorporated with a one-way transmission.

FIG. 2 shows another preferred embodiment of a bi-status coupler in the structure illustrated in FIG. 1 that is comprised of an electric vortex coupler incorporated with a one-way transmission including:

an input side 201: containing an axial, wheel, disk, or any other rotary kinetic energy transmission structure to be coupled to one side of a one-way transmission 204 and also coupled to the active rotary part 2031 of an electric vortex coupler;

an output side 202: containing an axial, wheel, disk, or any other rotary kinetic energy transmission structure to be coupled to the passive rotary part 2032 of the electric vortex coupler, and then couple to the other side of the one-way transmission 204;

the electric vortex coupler 203: available in two types of structure for option, one type including a magnetic field structure comprised of a permanent magnet or a winding excited by current to serve as the active rotary part 2031 of the electric vortex coupler; and an electric vortex conductor serves as the passive rotary part 2032 of the electric vortex coupler; the other type providing the same function but with a fixed structure of the magnetic field in the configuration of the electric vortex coupler further adapted with a rotary middle magnetic route, wherein, the middle magnetic route structure serves as the active rotary part 2031 of the electric vortex coupler and the an electric vortex conductor serves as the passive rotary part 2032 of the electric vortex coupler; consequently, when the active rotary part 2031 of the electric vortex coupler is rotating as driven by the input side 201, a relative revolution difference is created by electric vortex effect that varies depending on the changed load between the active rotary part 2031 of the electric vortex coupler and the input side 201, further to engage in flexible transmission to draw the passive rotary part 2032 of the electric vortex coupler and the to drive the output side 202; the coupling relation respectively between the active rotary part 2031 of the electric vortex coupler and the input side 201 as well as between the passive rotary part 2032 of the electric vortex coupler and the output side 202 can be exchanged to such that the active rotary part 2031 of the electric vortex coupler is coupled to the output side 202, and the passive rotary part 2032 of the electric vortex coupler is coupled to the input side 201; and the one-way transmission 204: comprised of a conventional one-way clutch, or a transmission that engages in one-way rotary transmission and idling in the other way, having its one end coupled to the input side 201 and the other side, to the passive rotary party 2032 of the electric vortex coupler.

Figure 3:
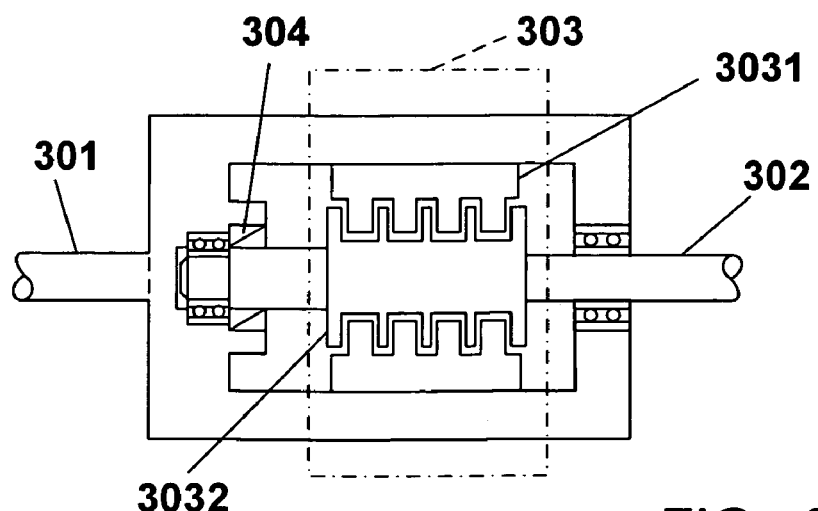
FIG. 3 is another preferred embodiment yet of a bi-status coupler taken from FIG. 1 that is comprised of a fluid coupler incorporated with a one-way transmission.

FIG. 3 shows another preferred embodiment yet of a bi-status coupler in the structure illustrated in FIG. 1 that is comprised of an fluid coupler incorporated with a one-way transmission including:

an input side 301: containing an axial, wheel, disk, or any other rotary kinetic energy transmission structure to be coupled to one side of a one-way transmission 304 and also coupled to the active rotary part 3031 of a fluid coupler;

an output side 302: containing an axial, wheel, disk, or any other rotary kinetic energy transmission structure to be coupled to the passive rotary part 3032 of the fluid coupler, and then couple to the other side of the one-way transmission 304;

the fluid coupler 303: comprised of an active rotary part 3031 of a fluid coupler, coupled to the input side 301, of the fluid coupler provided with multiple fins that produce actuated flow force, a passive rotary part 3032 of the fluid coupler that is driven by the flow force, and a casing, so that when the active rotary part 3031 of the fluid coupler is rotating as driven by the input side 301, a relative revolution difference that varies depending on the changed load is produced in the course of the transmission of kinetic energy via gas or liquid as the medium, thus to further engage in flexible transmission to drive the passive rotary part 3032 of the fluid coupler and the output side 302; the coupling relation respectively between the active rotary part 3031 of the fluid coupler and the input side 301 as well as between the passive rotary part 3032 of the fluid coupler and the output side 302 can be exchanged to such that the active rotary part 3031 of the fluid coupler is coupled to the output side 302, and the passive rotary part 3032 of the fluid coupler is coupled to the input side 301; and the one-way transmission 304: comprised of a conventional one-way clutch, or a transmission that engages in one-way rotary transmission and idling in the other way, having its one end coupled to the input side 301 and the other side, to the passive rotary party 3032 of the fluid coupler.

Figure 4:
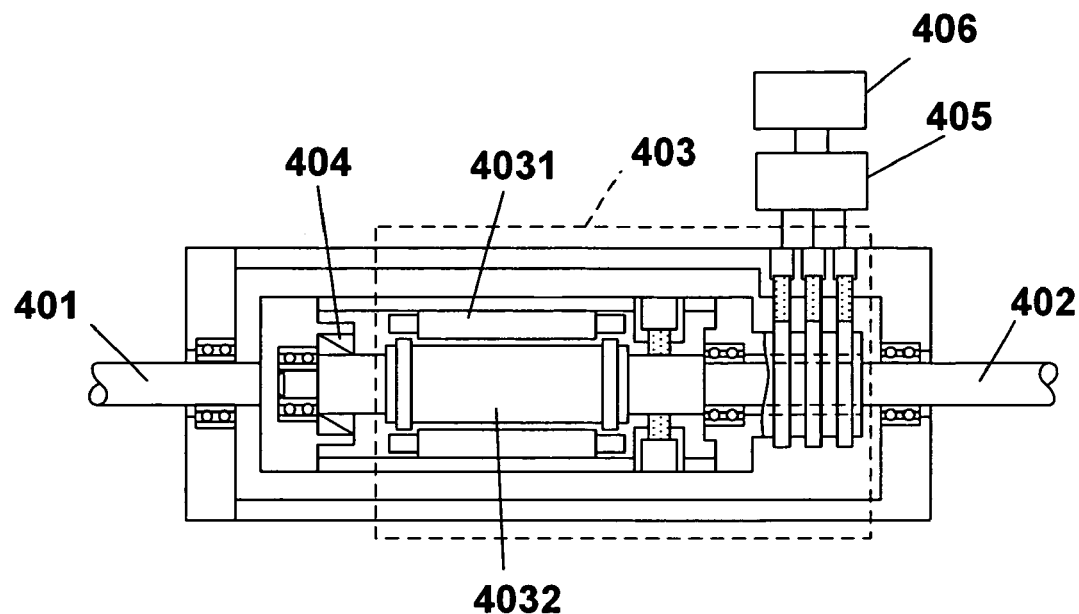
FIG. 4 is another preferred embodiment yet of a bi-status coupler taken from FIG. 1 that is comprised of an electromagnetic effect coupler incorporated with a one-way transmission.

FIG. 4 shows another preferred embodiment yet of a bi-status coupler in the structure illustrated in FIG. 1 that is comprised of a generation effect coupler incorporated with a one-way transmission including:

an input side 401: containing an axial, wheel, disk, or any other rotary kinetic energy transmission structure to be coupled to one side of a one-way transmission 404 and also coupled to the active rotary part 4031 of a generation effect coupler;

an output side 402: containing an axial, wheel, disk, or any other rotary kinetic energy transmission structure to be coupled to the passive rotary part 4032 of the generation effect coupler, and then couple to the other side of the one-way transmission 404;

the generation effect coupler 403: comprised of the active rotary part 4031 of the generation effect coupler related to a magnetic field comprised of a permanent magnet or a winding excited by current; and an armature engaging in relative rotation serves as the passive rotary part 4032 of the generation effect coupler; the active rotary party 4031 of the generation effect coupler is coupled to the input side 401 and the passive rotary part 4032 of the generation effect coupler is coupled to the output side 402, both control the generation power of the generation effect coupler 403 transmitted to a load 406 by means of a generation load controller 405; consequently, when the active rotary part 4031 of the generation effect coupler is rotating as driven by the input side 401, a relative revolution difference is created that varies depending on the changed load to execute flexible transmission of non-rigid transmission to drive the passive rotary part 4032 of the generation effect coupler and the to drive the output side 402; the coupling relation respectively between the active rotary part 4031 of the generation effect coupler and the input side 401 as well as between the passive rotary part 4032 of the generation effect coupler and the output side 402 can be exchanged to such that the active rotary part 4031 of the generation effect coupler is coupled to the output side 402, and the passive rotary part 4032 of the generation effect coupler is coupled to the input side 401;

the one-way transmission 404: comprised of a conventional one-way clutch, or a transmission that engages in one-way rotary transmission and idling in the other way, having its one end coupled to the input side 401 and the other side, to the passive rotary party 4032 of the generation effect coupler; and a generation load controller 405: comprised of a dynamo-electric or solid-state electronic circuit to control the generation power of the generation effect coupler 403;

a load 406: related to a resistance or other external load to serve as the generation load for the generation effect coupler 403.

Figure 5:
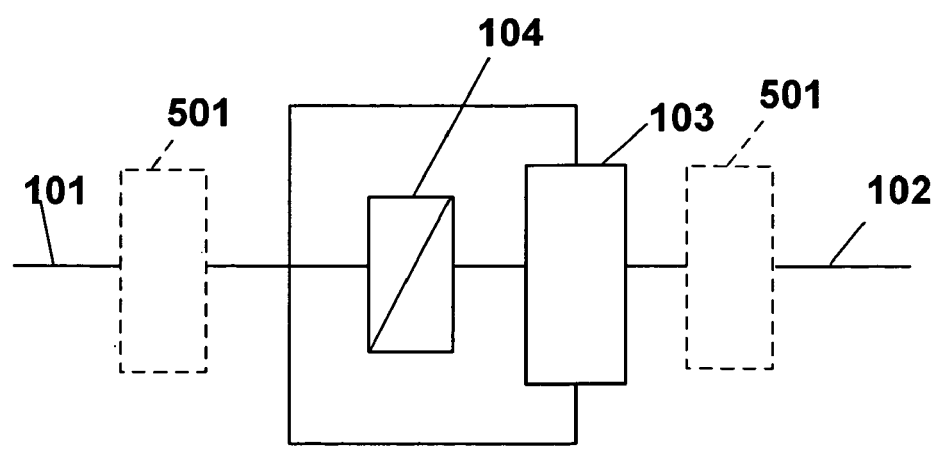
FIG. 5 is a schematic view of a structure of a controllable clutch adapted to the input or the output side of the preferred embodiment illustrated in FIG. 1.

The flexible and rigid bi-status coupler and its application device is further adapted on its output side in series a controllable clutch for the flexible and rigid bi-status coupler and its application device to engage in mixed control. FIG. 5 showing a schematic view of a controllable clutch adapted to the input side or the output side of the preferred embodiment illustrated in FIG. 1 is essentially comprised of:

an input side 101: containing an axial, wheel, disk, or any other rotary kinetic energy transmission structure to be coupled to one side of a one-way transmission 104 and also coupled to the active rotary part of a flexible transmission 103;

an output side 102: containing an axial, wheel, disk, or any other rotary kinetic energy transmission structure to be coupled to the passive rotary part of a flexible transmission 103, and then couple to the other side of the one-way transmission 104;

the flexible transmission 103: comprised of an electric vortex coupler, a fluid coupler, or a generation effect coupler, provided with a active rotary part and a passive rotary part to engage in non-rigid rotation kinetic transmission with revolution difference and the transmission varies depending on a load; or any other coupler providing the similar function, having its active rotary part coupled to the input side 101, and its passive rotary part coupled to the output side 102 and to one end of the one-way transmission 104;

the one-way transmission 104: comprised of a conventional one-way clutch, or a transmission that engages in one-way rotary transmission and idling in the other way, having its one end coupled to the input side 101 and the other end, to the passive rotary part of the flexible transmission 103; and a controllable clutch 501: controllable by manual, mechanical force, electromagnetic force or fluid force to engaged the closed transmission and disengagement to cut off, thus to control the external transmission of the input side 101, or to control the external transmission of the output side 102; and the controllable clutch 501 may be provided on the input side 101 or on the output side 102 as applicable.

The flexible and rigid bi-status coupler and its application device of is the present invention by respectively giving flexible and rigid transmission bi-status coupling functions in both of the input and the output directions to be applied in energy storage impact type of load, such as a press or a punch lathe, or an instable fluid force drive device, such as a fluid force generator or fluid force actuated extractor hood, or a flywheel energy storage device, or other loads, is innovative with specific functions; therefore, this application for patent is duly filed accordingly.

The invention claimed is:

1. A flexible and rigid bi-status coupler and its application device wherein, the bi-status coupler is comprised of a generation effect coupler provided with flexible coupling function incorporated with a one-way transmission including:

an input side (401): containing a rotary kinetic energy transmission structure to be coupled to one side of a one-way transmission (404) and also coupled to the active rotary part (4031) of a generation effect coupler;

an output side (402): containing a rotary kinetic energy transmission structure to be coupled to the passive rotary part (4032) of the generation effect coupler, and then couple to the other side of the one-way transmission (404);

the generation effect coupler (403): comprised of the active rotary part (4031) of the generation effect coupler related to a magnetic field comprised of a permanent magnet or a winding excited by current; and an armature engaging in relative rotation serves as the passive rotary part (4032) of the generation effect coupler; the active rotary part (4031) of the generation effect coupler is coupled to the input side (401) and the passive rotary part (4032) of the generation effect coupler is coupled to the output side (402), both control the generation power of the generation effect coupler (403) transmitted to a load (406) by means of a generation load controller (405); consequently, when the active rotary part (4031) of the generation effect coupler is rotating as driven by the input side (401), a relative revolution difference is created that varies depending on the changed load to execute flexible transmission of non-rigid transmission to drive the passive rotary part (4032) of the generation effect coupler to drive the output side (402); the coupling relation respectively between the active rotary part (4031) of the generation effect coupler and the input side (401) as well as between the passive rotary part (4032) of the generation effect coupler and the output side (402) is configured to be exchanged such that the active rotary part (4031) of the generation effect coupler is coupled to the output side (402), and the passive rotary part (4032) of the generation effect coupler is coupled to the input side (401);

the one-way transmission (404): comprised of a conventional one-way clutch, or a transmission that engages in one-way rotary transmission and idling in the other way, having its one end coupled to the input side (401) and the other side, to the passive rotary part (4032) of the generation effect coupler; and the generation load controller (405): comprised of a dynamo-electric or solid-state electronic circuit to control the generation power of the generation effect coupler (403);

a load (406): related to a resistance or other external load to serve as the generation load for the generation effect coupler (403).

* * * * *